(12) United States Patent
Runne

(10) Patent No.: US 9,509,796 B2
(45) Date of Patent: Nov. 29, 2016

(54) MESSAGING WITH INSTRUCTIONS FOR MEDIA PLAYBACK

(75) Inventor: Michael Runne, Euless, TX (US)

(73) Assignee: VERIZION PATENT AND LICENSING INC., Basking Ridge, NJ (US)

( * ) Notice: Subject to any disclaimer, the term of this patent is extended or adjusted under 35 U.S.C. 154(b) by 962 days.

(21) Appl. No.: 12/693,039

(22) Filed: Jan. 25, 2010

(65) Prior Publication Data

US 2010/0251136 A1 Sep. 30, 2010

Related U.S. Application Data

(63) Continuation of application No. 11/610,859, filed on Dec. 14, 2006, now Pat. No. 7,707,601.

(51) Int. Cl.
*H04N 7/16* (2011.01)
*G06F 3/00* (2006.01)
*G06F 13/00* (2006.01)
*H04L 29/08* (2006.01)

(52) U.S. Cl.
CPC .................... *H04L 67/306* (2013.01)

(58) Field of Classification Search
USPC ................................. 725/25–31, 46
See application file for complete search history.

(56) References Cited

U.S. PATENT DOCUMENTS

| | | | |
|---|---|---|---|
| 6,434,747 B1* | 8/2002 | Khoo et al. | 725/46 |
| 7,185,355 B1* | 2/2007 | Ellis et al. | 725/46 |
| 7,305,691 B2 | 12/2007 | Cristofalo | |
| 2002/0166119 A1* | 11/2002 | Cristofalo | 725/34 |
| 2004/0073915 A1 | 4/2004 | Dureau | |
| 2005/0251827 A1* | 11/2005 | Ellis et al. | 725/47 |
| 2007/0245365 A1* | 10/2007 | Mitsui | 725/13 |
| 2012/0079525 A1* | 3/2012 | Ellis et al. | 725/28 |

* cited by examiner

*Primary Examiner* — Nasser Goodarzi
*Assistant Examiner* — Fred Peng

(57) ABSTRACT

A content processing device is provided. Media content is selectively provided to the content processing device. A profile is used to determine the media content. A software application is included on the content processing device and is configured to receive a message from a remote computer, receive user inputs in response to the message, and update the profile based on the user inputs.

14 Claims, 6 Drawing Sheets

MESSAGING WITH INSTRUCTIONS FOR MEDIA PLAYBACK

CROSS REFERENCE TO RELATED APPLICATIONS

This application is a continuation of U.S. patent application Ser. No. 11/610,859, filed on Dec. 14, 2006, which is hereby incorporated by reference in its entirety.

BACKGROUND INFORMATION

Media providers such as broadband, satellite, and cable companies provide access to many media channels. Users generally are able to control access to such channels through a content processing device such as a set top box (STB) that allows users to select channels for viewing. Further, access to media channels may be controlled by mechanisms such as user profiles that are downloaded to a content processing device when a particular user is identified. For example, an STB may transmit an identifier to a remote server to obtain a profile used to determine programming channels that may be made available through the STB. To take another example, a child may be required to enter a user identifier or the like using a remote control associated with an STB. This user identifier may then be associated with a user profile that specifies particular media channels that the child may access, and/or times when the child may access these media channels. However, establishing and modifying a profile that governs a user's access to media channels generally requires direct access to the STB, e.g., accessing a menu or the like that is provided by the STB and displayed on a media playback device such as a television, and providing input to establish or modify the profile. Users presently lack mechanisms for remotely modifying their own or other users' profiles that govern access to media channels.

Further, users responsible for profiles of other users presently lack mechanisms for allowing such profiles to be modified in response to conditions or events that may arise. For example, a parent may wish to allow a child's profile to be modified if the child satisfies certain conditions such as performing chores. However, at present, a user profile governing access to media channels can generally only be modified by accessing an STB and providing manual inputs, as described above.

DETAILED DESCRIPTION OF PREFERRED EMBODIMENTS

A media content processing device may be configured to process messages from a messaging server, and to receive configuration updates from a profile database. Messages may be sent and received between the content processing device and a messaging server via a network. A message may be a text message from one user to another. In addition, a message may be an instructional message that affects various settings in the content processing device. Media content may include, without limitation, any television program, on-demand program, pay-per-view program, broadcast media program, Internet Protocol Television (IPTV), commercial, advertisement, video, movie, radio program, song, image, photograph, sound, etc., or any segment, component, or combination of these or other forms of media content.

Figure 1A:
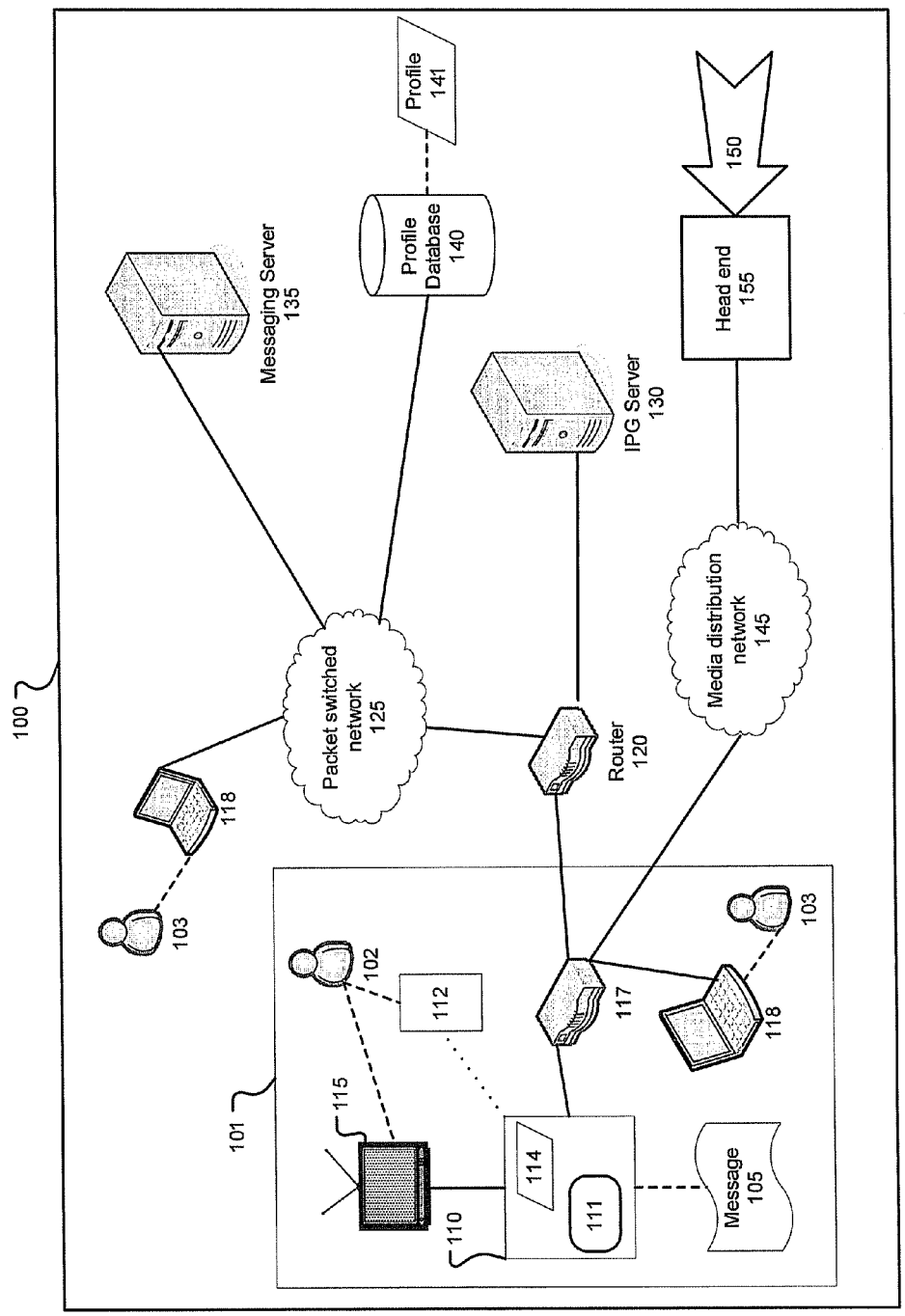
FIG. 1A illustrates an exemplary system for delivering media content and providing messages and instructions.
Figure 1B:
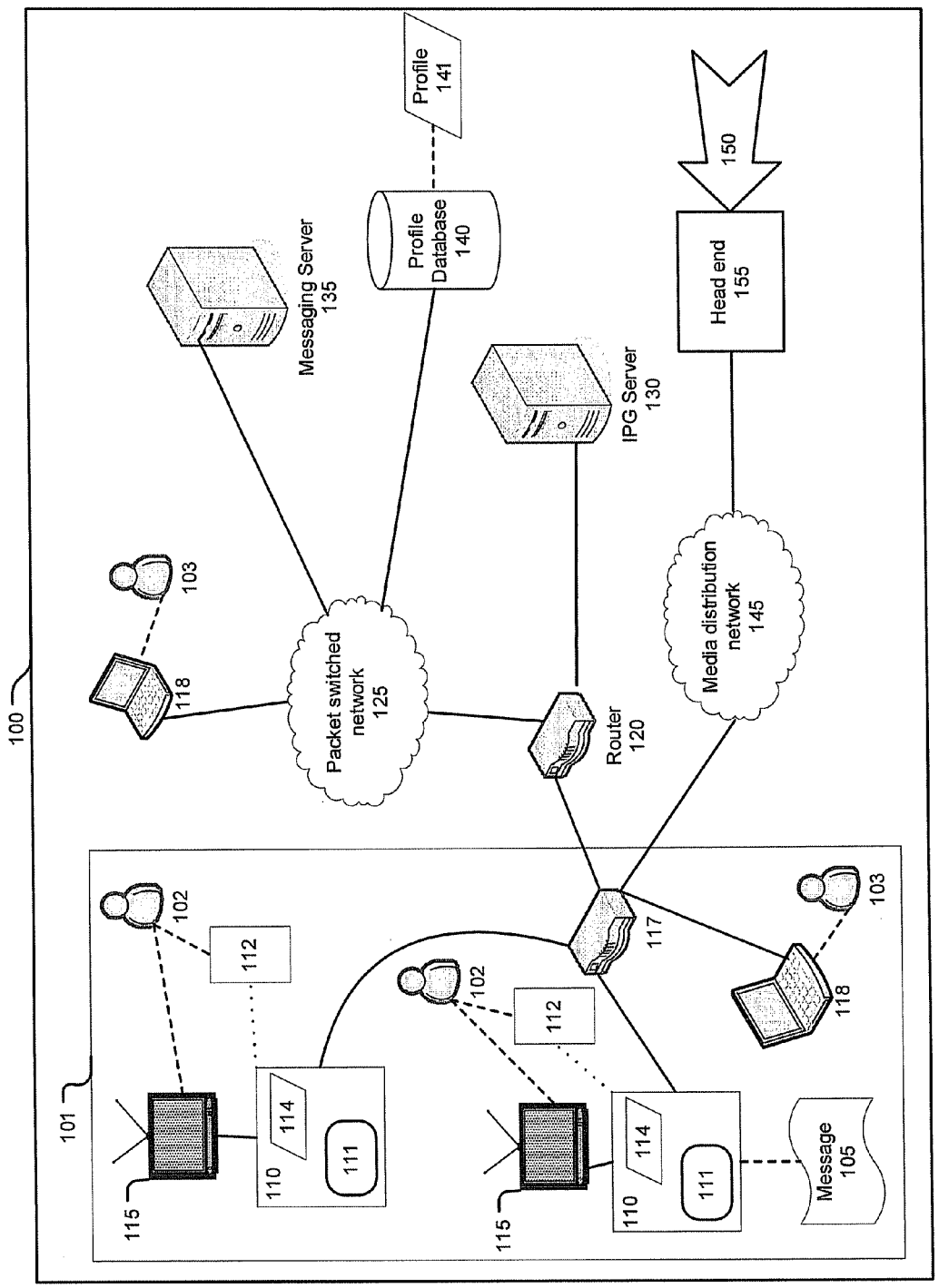
FIG. 1B illustrates an exemplary system for delivering media content and data to multiple content processing devices in customer premises.

FIG. 1A illustrates an exemplary system 100 for delivering media content 150 to a customer premise 101, whereby a user 102 may access the content 150 through a media playback device 115. Customer premises 101 may be a home, business, or any other location including a content processing device 110, and may include multiple content processing devices 110, as is illustrated in FIG. 1B.

Content processing device 110 generally is a specialized device, e.g., a set top box (STB) or similar device, for receiving media content 150 from head end 155 via network 145, and for providing media content 150 to media player 115. Media content 150 may be provided as an analog or as a digital signal, e.g., an analog or digital video signal. Content processing device 110 generally includes a processor and a memory, and may be provided with a proprietary or specialized operating system. For example, content processing device 110 may be an STB provided with a real time operating system (RTOS) such as is known. However, it is to be understood that content processing device 110 may be a computing device such as one of those enumerated below, so long as the computing device is capable of receiving media content 150 from network 145, and is capable of storing and executing the instructions included in message 105. Content processing device 110 generally also includes, e.g., stored in a read only memory (ROM), a unique or substantially unique identifier 114 that identifies the content processing device 110.

Further, content processing device 110 generally includes a user application 111. User application 111 generally includes program instructions for, among other things, receiving messages via a packet switched network 125 and also usually via a messaging server 135, providing such messages for display on media player 115, accepting input from media player 115 in response to messages, providing instructions to and receiving instructions from a profile database 140, etc.

Media player 115 receives media content 150 from content processing device 110, and plays such media content 150 so that it can be perceived by a user. Media player 115 may be a television receiver, such as is known, including a television or a high definition television (HDTV). Media player 115 may also be used to provide a user interface to certain functions and menus provided by content processing device 110. For example, a television may be used to display a graphical user interface to access various menus within an STB.

A user 102 may utilize a control 112 to operate content processing device 110. Control 112 is generally a remote control that can selectively communicate with content processing device 110 through known wireless communications including infrared (IR) and radio frequency (RF) communications. Control 112 may include numeric keys, arrow buttons, keys for specific functions, etc., and may also include alphanumeric keys. Control 112 may also be a wired or wireless keyboard as is known. A user 102 may utilize control 112 to select media content channels, access various menus and optional settings, make selections and requests, and input data, such as a text message. Control 112 generally facilitates access to various to functions and menus provided by or through content processing device 110, and may also be used to control other devices, including media player 115.

Content processing device 110 selectively communicates with various devices via a broadband home router (BHR) 117, including a client computer 118, which may be accessed by a user 103. BHR 117 may be one or more devices that are generally known for routing network traffic. BHR 117 facilitates data transfer over one or more networks, including a packet switched network 125 and a media distribution network 155.

BHR 117 is known for distributing audio, video, and data to devices within customer premises 101 such as content processing device 110. For example, BHR 117 may be a broadband home router or wireless broadband home router from Actiontec Electronics, Inc. of Sunnyvale, Calif. BHR 117 may also provide a wired or wireless local area network (LAN), thereby providing selective communications between various devices within customer premises 101. For example, client computer 118 may utilize BHR 117 to communicate with content processing device 110. Client computer 118 may be a computer workstation, a desktop, notebook, laptop, handheld computer, a personal digital assistant (PDA), a cellular phone, a smartphone, or some other computing device utilizing hardware and software to communicate with content processing device 110. Known communication protocols may be used by such devices. For example, a cellular telephone may use Wireless Application Protocol (WAP) in connection with Wireless Markup Language (WML), Wireless Transport Protocol (WTP), etc.

Content processing device 110 may use BHR 117 to send information to, and receive information from, a packet switched network 125. BHR 117 may access packet switched network 125 through a gateway router 120. An interactive program guide (IPG) server 130 and a messaging server 135 may also selectively communicate with router 120, sometimes via network 125, but may also selectively communicate with BHR 117 via a media distribution network 145. Further, client computer 118 may communicate through packet switched network 125, thereby enabling a user 103 to send and receive messages 105 anywhere that client computer 118 may access the network 125.

Media distribution network 145 is a network for providing media content 150, such as is known. For example, network 145 may include hardware and software for providing a video signal via a coaxial cable and/or a fiber optic cable. As is known, media content 150 is generally provided to a media distribution network 145 from a head end 155.

Packet switched network 125 is generally an internet protocol (IP) network that utilizes known protocols found generally within the internet protocol suite. For example, network 125 uses protocols such as user datagram protocol (UDP), transmission control protocol (TCP), hypertext transfer protocol (HTTP), etc. Further, network 125 may include a variety of networks such as a wide area network (WAN), e.g., the internet, a local area network (LAN), etc. As is known, packet switched network 125 may be used to transport a variety of data, including multimedia data, such as audio and video. Accordingly, it is to be understood that embodiments are possible in which networks 125 and 145 are in fact combined into a single network, or in which media distribution network 145 is simply omitted, whereby packet switched network 125 is used to provide media content 150 to content processing device 110.

Gateway router 120 is known for routing data packets in packet switched network 125. Gateway router 120 allows content processing device 110 to access packet switched network 125. By communicating with router 120, content processing device 110 is able to obtain a network address such as an internet protocol (IP) address, thereby enabling content processing device 110 to make requests to, and to receive data from, an IPG server 130 and a messaging server 135.

IPG server 130 generally provides information related to available media content 150, and may also provide an interactive program guide to content processing device 110. Media content information may include dates and times of television programs and movies, descriptions of particular content, channel information, and parental guidelines. Parental guidelines may include information about specific programs, movies, or about entire channels. A user, such as a parent, may learn whether a particular program is appropriate for certain age groups through such parental guideline information. For example, a particular program may be flagged as being inappropriate for children under the age of fourteen. Parental guidelines may also include information relating to specific examples of potentially offensive material including various examples of obscenity, indecency, and profanity. The Federal Communication Commission's (FCC) "TV Parental Guidelines," available from the FCC, e.g., at http://www.fcc.gov/parents/parentguide.html, are one such example of information that may be provided by IPG server 130 to content processing device 110.

IPG server 130 may also provide an interactive program guide to content processing device 110 for display on media player 115. As is known, an interactive program guide allows users to obtain information and to select media content 150, generally by navigating and making selections using control 112. IPG server 130 generally includes a processor and a memory, as well as a computer readable medium such as a disk for storing data, e.g., interactive program guide data, to be provided to content processing device 110.

A messaging server 135 is also in selective communication with content processing device 110 and user application 111, generally via network 125. Messaging server 135 is generally configured to facilitate transfers of messages 105 between various computing devices including content processing device 110, client computer 118, and profile database 140. Messaging server 135 may be implemented in software running on IPG server 130, content processing device 110, client computer 118, or any other computing device capable of communicating via network 125. However, messaging server 135 may also be a standalone computing device that includes a processor and a memory, as well as a computer readable medium for storing data. Further, messaging server 135 may include other software, such as web server software as is known for providing web pages and the like.

Messaging server 135 may utilize various hardware and software systems to facilitate transfers of messages 105. Messaging server 135 may utilize other message transfer systems and protocols for message 105 including those within the suite of internet protocols including e-mail, simple mail transfer protocol (SMTP), hypertext transfer protocol (HTTP), file transfer protocol (FTP), extensible markup language (XML), simple object access protocol (SOAP), instant messaging, or a proprietary format or protocol. Message 105 may also utilize various encryption technologies including public key infrastructure (PKI), digital signatures, digital certificates, secure shell (SSH), secure sockets layer (SSL), and transport layer security (TLS), to name but a few.

In addition, messaging server 135 may include an instant messaging server such as is known, and application 111 may include an instant messaging client such as is known. Use of content processing device 110 for instant messaging is discussed further in co-pending application entitled INSTANT MESSAGING WITH A CONTENT PROCESSING DEVICE, filed the same day as the present application, and fully incorporated herein by reference in its entirety. Also fully incorporated herein by reference in its entirety is co-pending application entitled PARENTAL CONTROLS IN A MEDIA NETWORK, also filed the same day as the present application.

As discussed further below, it may be preferable for messaging server 135 to send and receive messages formatted according to hypertext markup language (HTML), extensible markup language (XML), or the like. Messaging server 135 may also utilize various security schemes and encryption technologies to verify the integrity and/or authenticity of a message 105, and/or to obscure the information within message 105 from unintended recipients and eavesdroppers. Such technologies generally include public key infrastructure (PKI), digital signatures, digital certificates, secure shell (SSH), secure sockets layer (SSL), and transport layer security (TLS), to name but a few.

A profile database 140 stores profiles 141. A profile 141 may be associated with one or more various entities, such as a user 102, a content processing device 110, and/or a customer premise 101. Accordingly, profile 141 generally is associated in database 140 with at least one of a user 102 identifier, an identifier 114 for a content processing device, an identifier for customer premises 101, etc. Further, profile 141 generally includes information identifying subscribed-for services via network 145, such as subscribed-for channels of media content 150. A profile 141 may also include personalization settings, media access restrictions, records of accessed media content 150, etc. Profile database 140 is generally in communication with content processing device 110 and messaging server 135 via network 125, but may be included within messaging server 135.

Profile 141 may be used to impose restrictions on media content 150 that may be accessed through a content processing device 110. As is known, content processing device 110 may require passcodes or the like in order to display some or all of the available channels of media content 150 from network 145. Such passcodes may be included in a profile 141. In fact, it is common to require a content processing device 110 to retrieve a profile 141 specifying media content 150, e.g., channels of media content 150, which may be provided via the content processing device 110, before media content 150 may be shown via the content processing device 110. Further, various schemes for restricting media content 150 through content processing device 110, which schemes may be selected or defined by a user 102, may also be enforced by using a profile 141. For example, a media restriction scheme may limit the times during a day when media content 150 will be accessible, channels of media content 150 that are accessible, or both. Content processing device 110 may, to take just one example among many, restrict the accessibility of media content 150 to two hours a day, regardless of what channels of, or when, media content 150 is accessed.

Profile database 140 may provide information that causes content processing device 110 to modify various settings. For example, profile database 140 may receive updated information concerning channels of media content 150 to be made available, possibly including dates and/or times when such channels are to be made available. Content processing device 110 may then receive an updated profile 141, and in turn, modify access to channels of media content 150. A profile 141, and therefore various changes, may apply to all content processing devices 110 that are associated with customer premises 101, to one particular content processing device 110, to a group of users 102, or to a particular user 102. Profile database 140 may be programmed to provide an updated profile 141 to content processing device 110, although content processing device 110 may query profile database 140 periodically for updates, e.g., every ten minutes.

Where media content 150 is to be restricted according to the identity of a user 102, content processing device 110 may require that a user 102 be identified before allowing access to media content 150. Authenticating a user 102 may involve the user entering a user identification string, a username and password combination, a personal identification number (PIN), a password, etc., using control 112, or some other authentication method. Content processing device 110 may then query profile database 140 for information from a user profile 141, using protocols such as HTTP to communicate via network 125. Content processing device 110 may use profile 141 to provide the user with various features and services tailored specifically for that user. Content processing device 110 may also monitor, store, and send data relating to the user to profile database 140 via network 125. Such information may include listings of accessed media content, dates and times of access, personalized channel lists, favorite TV programs, and accounting data relating to the amount of time the user spent accessing various media content, and may be used to update or modify profile 141. Profile database 140 may then store such information in a relational format, ensuring that such data is correctly associated with a particular user, group, content processing device 110, or customer premises 101. Content processing device 110 may communicate with profile database 140 to manage various user-specific functions and features, including parental control mechanisms. Profile database 140 may track viewing habits and parental control restrictions for a user 102, and, using messaging server 135, prompt content processing device 110 to perform various actions by sending message 105.

Message 105 generally includes digital data providing an instruction that prompts content processing device 110 to perform an action, or that is provided in a display, e.g., of playback device 115, perhaps prompting user 102 to take an action, or provide some input. For example, as described below, message 105 may include a form including questions to be answered by user 102, e.g., by selecting checkboxes, radio buttons, and the like. User input may include a personal message from one user to another, e.g., from user 103 to user 102, including a text, image, audio, or video message. User input may also include a menu-driven selection, where the menu provides choices of various internal settings within content processing device 110, and the selection is the desired setting. For example, content processing device 110 may be an STB that includes parental controls, and a user may select various parental control options or settings from a menu. Instructions included within message 105 may include a request for content processing device 110 to perform an action, such as displaying the contents of message 105 by superimposing the contents over the currently played media content, or modifying various settings within profile 141, which in turn will result in the modification of various settings in content processing device 110.

FIG. 1B illustrates an exemplary system for delivering media content 150 and data to multiple content processing devices 110 in customer premises 101. It will be noted that all elements shown in FIG. 1A are also shown in FIG. 1B. However, FIG. 1B further illustrates that a customer premise 101 may include multiple content processing devices 110.

Figure 1C:
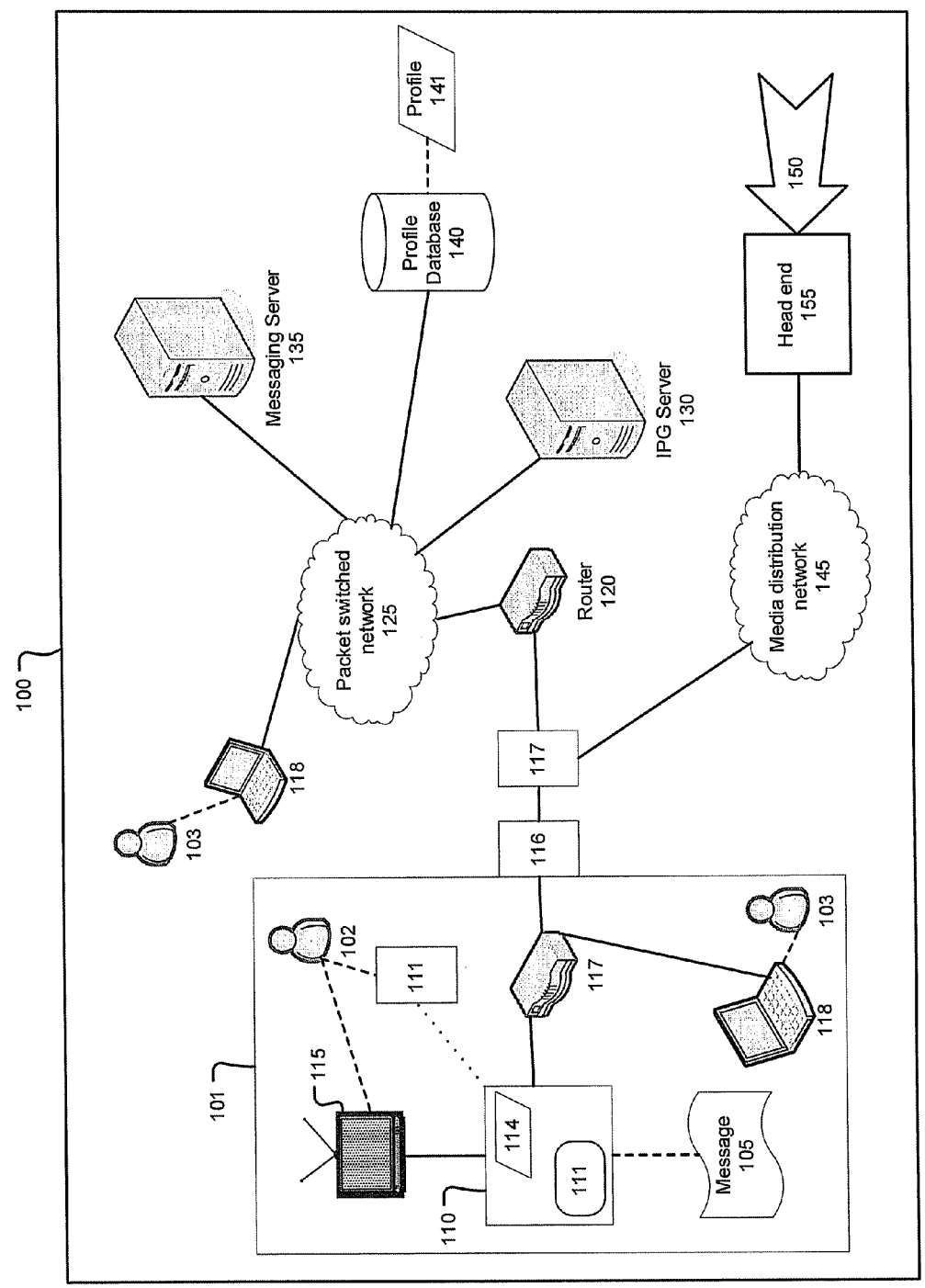
FIG. 1C illustrates another exemplary system for delivering media content and providing messages and instructions using fiber optic cable.

FIG. 1C illustrates another exemplary system for delivering media content 150 and data to content processing device 110. As can be seen, FIG. 1C illustrates all of the elements illustrated in FIG. 1A, with the addition of an optical line terminal (OLT) 117 and an optical network terminal (ONT) 116. Accordingly, FIG. 1C illustrates an exemplary system in which fiber optic cable is used to provide both data and media content 150 to customer premises 101, including to content processing device 110. As is known, OLT 117 may serve as a terminus for an optical network or an optical line. OLT 117 may provide data, including media content 150, to one or more ONTs 116. ONT 116 can be situated adjacent to customer premises 101, for the purpose of providing data received over an optical line to customer premises 101, including content processing device 110. Accordingly, FIG. 1C illustrates a hybrid network system 100 in which media content 150 transported over media distribution network 145 and data transported over packet switched network 125 are received by customer premises 101 through a fiber optic line.

Computing devices such as content processing device 110, client computer 118, IPG server 130, messaging server 135, and similar devices may employ any of a number of known computer operating systems. For example, such devices may use any known versions and/or varieties of the Microsoft Windows operating system; the Unix operating system (e.g., the Solaris operating system distributed by Sun Microsystems of Menlo Park, Calif.); the AIX UNIX operating system distributed by International Business Machines of Armonk, N.Y.; and the Linux operating system. Computing devices may include any one of a number of computing devices that are known, including, without limitation, a computer workstation, a desktop, notebook, laptop, handheld computer, or some other computing device.

Content processing device 110 generally also includes application 111. Application 111 includes computer-executable instructions and may provide various services such as parental controls, remote communications, instant messaging, data collection, as well as many others. Such software may be commercially available or proprietary and may include multiple software packages or modules. Content processing device 110 may also include application 111 for providing a graphical user interface (GUI) to a user. Such a GUI generally provides the user with the ability to interact with various other software modules, packages, and mechanisms within content processing device 110, and generally included in application 111. The GUI may allow a user to modify various internal settings within content processing device 110, and may provide one method for a user to interact with messaging server 135. A user may access the GUI using control 112 and view the GUI using media player 115. For example, application 111 may include an instant messaging application, such as an IM client, that a user can access using control 112 and view using media player 115. A user may supply input, such as is mentioned above, for message 105 using the GUI and control 112. The user's input may be a text message, or may be derived from a series of menu selections. Preferably, content processing device 110 accepts a user's input using control 112 and a GUI that is displayed using media player 115. Content processing device 110 may then provide the user's input into message 105.

Computing devices, such as content processing device 110, generally include instructions executable by one or more computing devices such as those listed above. Computer-executable instructions may be compiled or interpreted from computer programs created using a variety of programming languages and/or technologies known to those skilled in the art, including, without limitation, and either alone or in combination, Java, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example: a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Figure 2:
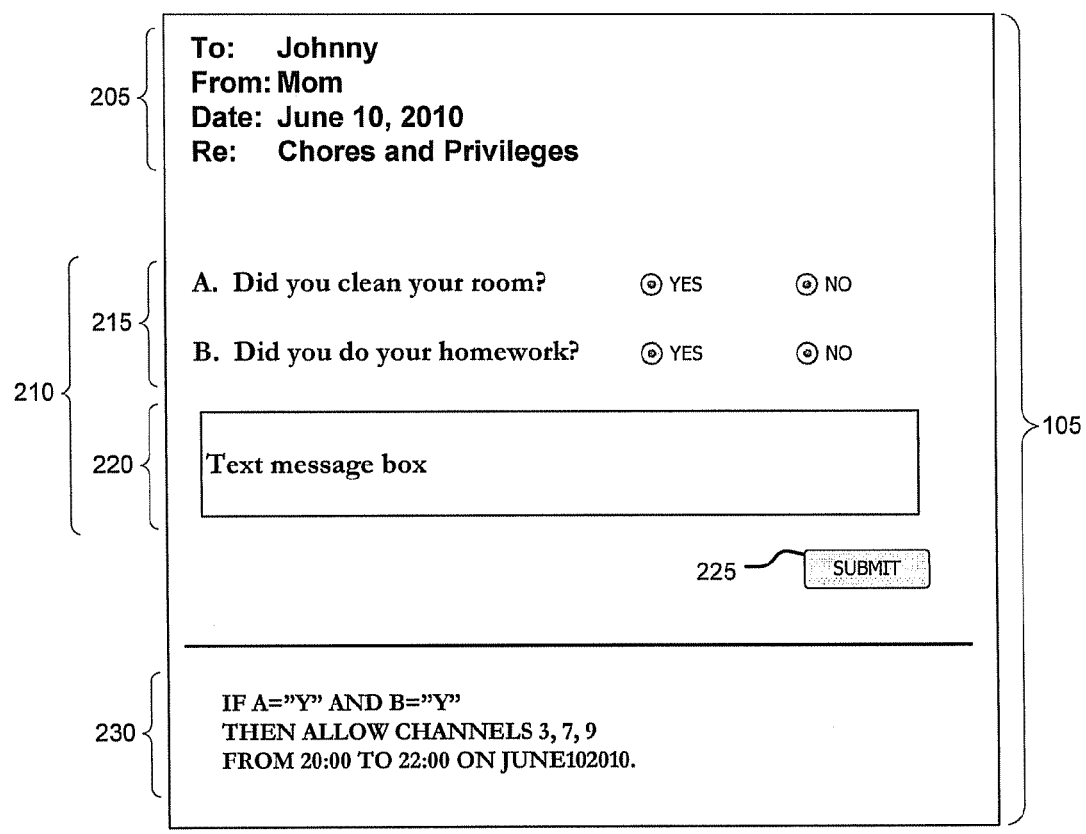
FIG. 2 illustrates an exemplary message.

FIG. 2 illustrates an exemplary message 105. It may be noted that message 105 resembles an e-mail message such as is known to be formatted according to HTML. In fact, HTML is one possible format for message 105. Message 105 may also be formatted according to XML or some other protocol. It is also possible that message 105 be formatted and sent according to an e-mail protocol such as simple messaging protocol (SMTP) or the like.

A header field 205 provides information about the sender and recipient of the message 105, along with information about the date and subject of the message 105.

A form 210 may include a questionnaire 215 and a text message box 220, along with a submit button 225. Questionnaire 215 may use known form elements such as radio buttons, checkboxes, drop-down list boxes, and the like to obtain information from a user 102. Text message box 220 is omitted in some embodiments, but may be desirable for allowing a user 102 to create textual message to be returned to a creator of the message 105. Further, embodiments are possible in which text message box 220 is the only element included in form 210 in message 105.

When a user 102 selects submit button 225, e.g., via control 112, content processing device 110 may submit information to profile database 140 to update profile 141 according to a logic 230. For example, as illustrated in FIG. 2, if questionnaire 215 indicates that a user 102 has claimed his or her room and done his or her homework, then profile 141 may be updated to reflect to that the user 102 is permitted to access certain channels of media content 150 during a specified time period on a specified date.

Selection of submit button 225 may also cause information to be sent to messaging server 135, e.g., using HTTP, SMTP, or one or more other protocols. Such information may include the results of questionnaire 215 and any text placed in text message box 220. Messaging server 135 may be configured to store such information for retrieval by a creator of the message 105, or may be configured to create and send such information to the creator of the message 105, e.g., via e-mail.

Figure 3:
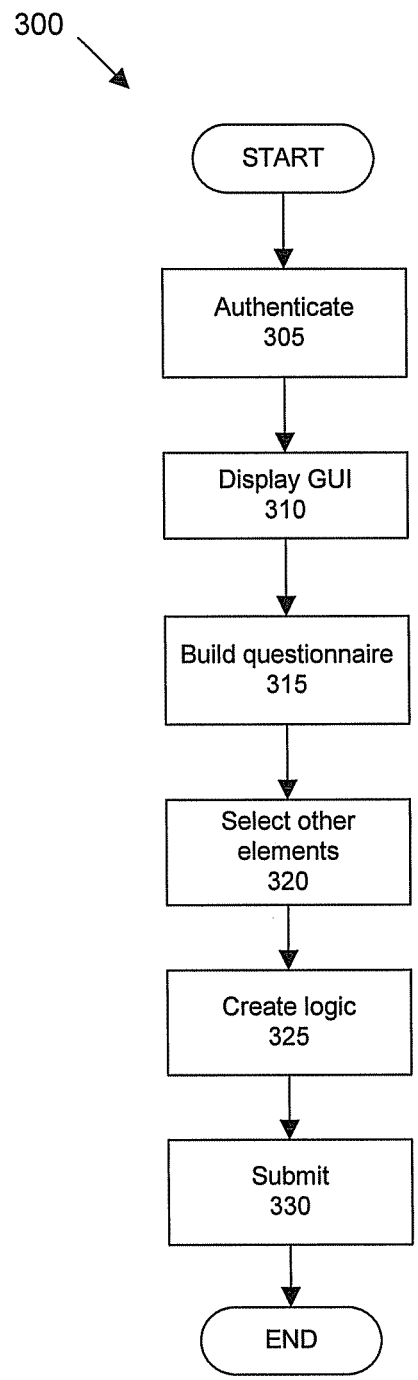
FIG. 3 illustrates an exemplary process for creating a message.

FIG. 3 illustrates an exemplary process 200 for creating a message 105.

In step 305, user 103 on client computer 118 is authenticated, using known authentication mechanisms, to a web server or the like included on messaging server 135. Further, although not illustrated in FIG. 1A, 1B, or 1C, it is to be understood that user 103 may access messaging server 135 through content processing device 110, e.g., by interacting with a graphical user interface (GUI) displayed on media player 115. It is further to be understood that user 103 must provide authentication information, e.g., a username and password, associated with authorization to make changes in a user profile 141 associated with a user 102. For example, user 103 may be a parent authorized to make changes in the user profile 141 of a child user 102. Accordingly, messaging server 135 may include authorization information indicating that user 103 may create a message 105 for a user 102, and the response to such message 105 may be used to alter the user profile 141 of the user 102.

Next, in step 310, messaging server 135 provides a GUI that may be accessed via client computer 118 and that may be used to create a message 105. For example, a GUI provided by messaging server 135 could provide a succession of screens in a GUI that provided for selection of a user 102 for whom a message 105 is to be created, allow for creation of a questionnaire 215, logic 230, etc.

Accordingly, next, in step 315, messaging server 135 displays a GUI or series of GUIs whereby user 103 may create a questionnaire 215. For example, user 103 may be allowed to create a series of questions each associated with a series of form elements, e.g. radio buttons, checkboxes, drop-down lists, etc.

Next, in step 320, user 103 is provided in a GUI with the opportunity to include additional elements in form 210, such as text message box 220 as illustrated in FIG. 2.

Next, in step 325, a GUI is displayed and client computer 118 that allows user 103 to associate responses in form 210 with logic 230. For example, the GUI may present a grid of available channels of media content 150, and may allow user 103 to specify dates and/or periods of time when such channels of media content 150 may be made available to a user 102 depending on responses received through submission of form 210.

Next, in step 330, user 103 submits the newly created message 105 to messaging server 135.

Following step 330, process 300 ends.

Figure 4:
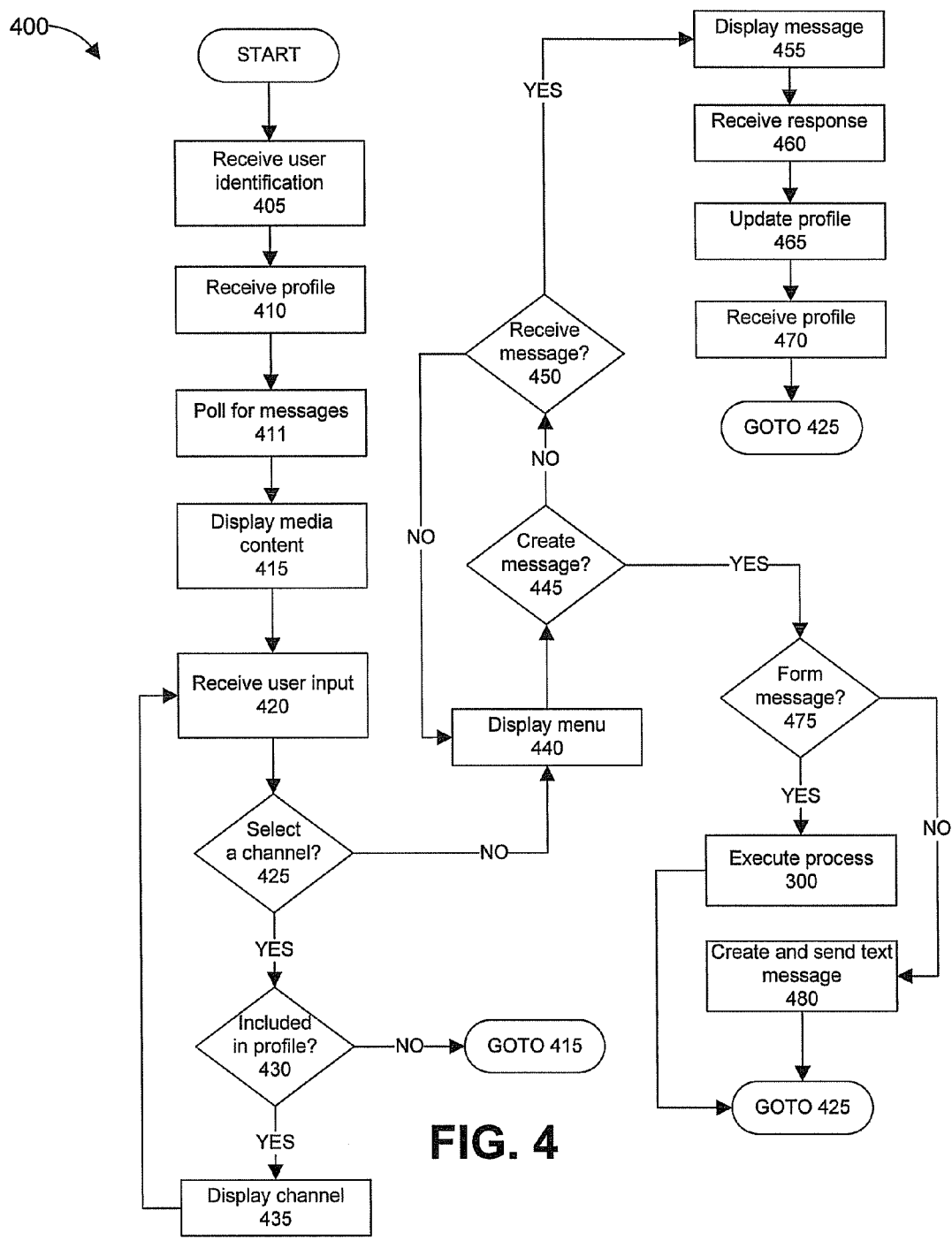
FIG. 4 illustrates an exemplary process for displaying content according to messages.

FIG. 4 illustrates an exemplary process 400 for providing a display of media content 150 in media playback device 115, including displaying content according to messages 105. In the description of this process 400 and other processes disclosed herein, it is to be understood that generally, user input may be received in various ways by different computing devices. For example, user input may be received by messaging server 135 using a web page or the like the displayed in a browser, such as is known. In addition, client computer 118 may receive user input using special software. User input may also be received by a personal digital assistant (PDA), handheld computer, or the like using special software or a browser. Further, user input may be received by content processing device 110 using application 111 and control 112.

In step 405, content processing device 110 is powered on and provides identification information to profile database 140 and generally also to messaging server 135. Such identification generally includes identifier 114 associated with content processing device 110, but may include simply an identifier for customer premises 101. Further, identification provided in this step may include an identifier for a user 102 or a group of users 102, e.g., according to input provided by a user 102 via control 112 as described above.

Next, in step 410, content processing device 110 receives a profile 141 or portions thereof from profile database 140 according to the identification information provided in step 410. Generally, the data received from profile database 140 may be used to authenticate a user, provide the user 102 with a personalized experience, create menu options in a GUI displayed in playback device 115, etc. In particular, profile 141 is used to determine channels of media content 150 that content processing device 110 may provide for display in media player 115. However, as mentioned above, in some embodiments profile 141 is retrieved according to only an identifier 114 for content processing device 110, and not according to identifier for a user 102. Such embodiments therefore essentially treat all persons accessing content processing device 110 as a single user 102.

Next, in step 411, content processing device 110 receives from messaging server 135 messages 105 that have been received according to profile 141, e.g., according to an identifier for a user 102.

It is to be understood that content processing device 110 generally polls profile database 140 and messaging server 135 respectively in steps 410 and 411. Although not illustrated in FIG. 4, such polling further occurs at predetermined intervals during process 400. When such polling detects changes to profile 141 or new messages 105, content processing device 110 may update media content 150 and/or messages 105 displayed in media player 115 accordingly.

Following step 411, in step 415, content processing device 110 provides media content 150 for display in media playback device 115. For example, the media content 150 displayed in this step may be media content 150 that was last displayed the previous time that content processing device 110 was powered on for use. Of course, only media content 150 permitted by the profile received in step 410 may be provided.

Next, in step 420, content processing device 110 receives input from user 102, e.g., via a control 112.

Next, in step 425, content processing device 110 determines whether the input received in step 420 was a request for a particular channel of media content 150. For example, a user 102 may have pressed channel arrow keys or entered a number on a numeric keypad of control 112. If the input received in step 420 was a request for a particular channel of media content 150, step 430 is executed next. Otherwise, step 440 is executed next.

In step 430, content processing device 110 determines whether the request for a particular channel media content 150 received in step 420 is for a channel of media content 150 included in the profile 141 received in step 410. That is, content processing device 110 determines whether user 102, customer premises 101, content processing device 110, etc., or some combination thereof, is permitted to access the requested channel of media content 150 according to profile 141. If so, step 435 is executed next. Otherwise, process 400 returns to step 415, i.e., content processing device 110 continues providing media content is provided in step 415.

In step 435, content processing device 110 provides for display on media player 115 the channel of media content 150 requested in step 420. Step 435 is completed when user input is received as described above with respect to step 420, and therefore FIG. 4. shows step 420 being executed following step 435.

In step 440, which may follow step 425, content processing device 110 causes a menu of options to be displayed to user 102 on media playback device 115. It is to be understood that the menu displayed in step 440 may include a series of menus or screens such as may be displayed in an IPG. However, the menu displayed in step 440 further includes options to send and generally also to view received messages 105. That is, assuming that received messages 105 were detected in step 411, the menu displayed in step 440 may include an option to view messages 105 or may list messages 105 that a user may select for viewing.

Next, in step 445, content processing device determines whether a user 102 has provided input selecting to send a message 105. If so, step 475 is executed next. Otherwise, step 450 is executed next.

Next, in step 450, content processing device 110 determines whether user 102 has provided input selecting to view a received message 105. If so, step 455 is executed next. Otherwise, process 400 returns to step 440.

In step 455, the received message 105 selected in step 450 is provided for display by media playback device 115.

Next, in step 460, user 102 provides a response to the received message 105, e.g., by filling in form 210, including questionnaire 215 and/or text message box 220, etc., and the response is provided to profile database 140 and/or messaging server 135.

Next, in step 465, profile database 140 updates profile 141 according to the response provided in step 460.

Next, in step 470, updated profile 141 is provided to content processing device 110. Generally, as mentioned above, content processing device 110 may regularly poll or query profile database 140 receive the most current profile 141. However, profile database 140 may also be programmed, following receipt of a response as described above with respect to step 460, to provide an updated profile 141 to content processing device 110. Following step 470, process 400 returns to step 425.

In step 475, which as described above may follow step 445, content processing device 110 determines whether a request has been received to create a form message 105, e.g. a message whereby input may be received to alter a user profile 141. If so, process 300 is executed, following which process 400 returns to step 425. Otherwise, step 480 is executed next.

In step 480, user 102 may create a simple text message or the like to be sent to a specified e-mail address or to another user 102 or 103. For example, messages for other users 102 or 103 may be stored on messaging server 135, and provided to such users 102 or 103 when messaging server 135 is accessed by the users 102 or 103. Following step 480, process 400 returns to step 425.

Although no termination point or endpoint is shown in FIG. 4 with respect to process 400, it is to be understood that process 400 may end during or after any step in process 400 when content processing device 110 is powered off.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising:
  a content processing device that selectively receives media content;
  a profile that is used to determine the media content; and
  a software application included on the content processing device that is configured to:
    create a message on a client computer based on at least one first user selection, the message including at least one question and a response logic associated with the at least one question;
  display the message on a remote computer;
  receive remote user inputs from a second user in response to the message incorporating the at least one question and the response logic; and
  update the profile based on the remote user inputs received from the second user in response to the message, wherein the remote computer includes a messaging server configured to receive messages from the client computer,
  wherein the messaging server provides at least one user interface to the client computer, the interface including at least one user selection,
  wherein the user interface allows for the creation of at least one questionnaire, the questionnaire including the at least one question, the at least one question associated with the response logic, wherein the profile includes a media access restriction, wherein the media access restriction regulates viewing of at least a subset of the media content based on the user inputs, and wherein the user inputs include answers to the at least one question and the response logic associated with the at least one question updates the media access restriction in the profile.

2. The system of claim 1, further comprising displaying the message on a media playback device for prompting user inputs.

3. The system of claim 1, wherein the response logic is associated with a variable created by the user selection and the profile is updated based on the variable selected by the user inputs.

4. The system of claim 1, wherein the user interface includes at least one text messaging box for creating a textual message to be included in the message.

5. A method comprising:
receiving media content, wherein the media content is determined according to a profile;
creating a message on a client computer based on at least one first user selection, the message including at least one question and a response logic associated with the at least one question;
displaying the message on a remote computer;
receiving remote user inputs from a second user in response to the message incorporating the at least one question and the response logic; and
updating the profile based on the remote user inputs received from the second user in response to the message,
wherein the profile includes a media access restriction,
wherein the media access restriction regulates viewing of at least a subset of the media content based on the user inputs, and
wherein the user inputs further include answers to the at least one question and the response logic associated with the at least one question updates the media access restriction in the profile.

6. The method of claim 5, further comprising displaying the message on a media playback device for prompting user inputs.

7. The method of claim 5, further comprising providing at least one user interface to the client computer, the interface including at least one user selection.

8. The method of claim 7, further comprising sending at least one questionnaire to the remote computer, wherein the questionnaire includes the at least one question and the at least one associated response logic.

9. The method of claim 5, further comprising associating the response logic with a variable created by the first user selection and updating the profile based on the variable selected by the user inputs received from the second user.

10. The method of claim 5, wherein the message further includes a text messaging box for creating a textual message to be included in the message.

11. A system, comprising:
a content processing device that selectively receives media content;
a profile that is used to determine the media content, wherein the profile includes a media access restriction; and
a software application included on the content processing device that is configured to:
create a questionnaire on a client computer based on at least one user selection;
submit the questionnaire to a remote computer;
receive user inputs in response to the questionnaire; and
update the profile by modifying the media access restriction based on the user inputs.

12. The system of claim 11, wherein the questionnaire includes at least one question, each question associated with a response logic.

13. The system of claim 12, wherein the profile is updated based on the response logic created by the user selection.

14. The system of claim 13, wherein the user inputs include answers to at least one question and the response logic associated with each question updates the profile.

* * * * *